United States Patent
Attard et al.

(10) Patent No.: US 10,788,396 B2
(45) Date of Patent: Sep. 29, 2020

(54) USING AN ARTIFICIAL NEURAL NETWORK FOR COMBUSTION PHASING CONTROL IN A SPARK IGNITED INTERNAL COMBUSTION ENGINE

(71) Applicants: William P Attard, Brighton, MI (US); Shu Wang, Rochester Hills, MI (US); Shuonan Xu, Troy, MI (US); Tyler Tutton, Royal Oak, MI (US); Srinath Gopinath, Bloomfield Hills, MI (US); David A Lawrence, Lake Orion, MI (US)

(72) Inventors: William P Attard, Brighton, MI (US); Shu Wang, Rochester Hills, MI (US); Shuonan Xu, Troy, MI (US); Tyler Tutton, Royal Oak, MI (US); Srinath Gopinath, Bloomfield Hills, MI (US); David A Lawrence, Lake Orion, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 16/224,988

(22) Filed: Dec. 19, 2018

(65) Prior Publication Data

US 2020/0200140 A1 Jun. 25, 2020

(51) Int. Cl.
*G01M 15/04* (2006.01)
*F02P 5/15* (2006.01)
(Continued)

(52) U.S. Cl.
CPC ......... *G01M 15/04* (2013.01); *F02D 41/1405* (2013.01); *F02P 5/1502* (2013.01); *F02P 17/04* (2013.01)

(58) Field of Classification Search
CPC .... G01M 15/04; G01M 15/046; G01M 15/05; F02P 5/1502; F02P 17/04; F02D 41/1405
See application file for complete search history.

(56) References Cited

U.S. PATENT DOCUMENTS

| | | | |
|---|---|---|---|
| 4,893,244 A | 1/1990 | Tang et al. | |
| 6,236,908 B1 * | 5/2001 | Cheng | F02D 41/0062 701/1 |

(Continued)

OTHER PUBLICATIONS

Turkson, Richard F., et al., "Artificial neural network applications in the calibration of spark-ignition engines: An overview", Engineering Science and Technology, an International Journal 19, p. 1346-1359 (2016).

(Continued)

*Primary Examiner* — Hung Q Nguyen
*Assistant Examiner* — Mark L. Greene
(74) *Attorney, Agent, or Firm* — Ralph E Smith

(57) ABSTRACT

A calibration system and method for a spark ignition engine of a vehicle involve artificially weighting engine dynamometer data in high engine load regions and using it to generate training data for an artificial neutral network (ANN). A plurality of ANNs are trained using the training data and the plurality of ANNs are then filtered based on their maximum error to obtain a filtered set of trained ANNs. A statistical analysis is performed on each of the filtered set of trained ANNs including determining a set of statistical metrics for each of the filtered set of trained ANNs and then one of the filtered set of trained ANNs having a best combination of error at high engine loads and the set of statistical error metrics is then selected. Finally, an ANN calibration is generated using the selected one of the filtered set of trained ANNs.

16 Claims, 3 Drawing Sheets

(51) Int. Cl.
*F02P 17/04* (2006.01)
*F02D 41/14* (2006.01)

(56) References Cited

U.S. PATENT DOCUMENTS 6,460,408 B1 * 10/2002 Gimmler ............... F02D 35/024
701/106
2016/0258410 A1 9/2016 Cygan et al.
2016/0377043 A1 12/2016 Wang et al.

OTHER PUBLICATIONS

Xiao, Baitao, "Adaptive Model Based Combustion Phasing Control for Multi Fuel Spark Ignition Engines", http://tigerprints.clemson.edu/all_dissertations, p. 1-157 (2013).
International Search Report and Written Opinion dated Apr. 4, 2020 for International Application No. PCT/US2019/066445, filed Dec. 16, 2019.
Bin Wu et al: "2004-1-3054 Using Artificial Neural Networks for Representing the Air Flow Rate Through a 2.4 Liter VVT Engine", Oct. 25, 2004 (Oct. 25, 2004), XP055681250, Retrieved from the Internet: URL:https://saemobilus.sae.org/content/200 4-01-3054 [retrieved on Mar. 31, 2020] p. 3-p. 5.
B Wu et al: "A Simulation-Based Approach for Developing Optimal Calibrations for Engines with Variable Valve Actuation New Trends on Engine Control, Simulation and Modelling Avancees dans le controle et la simulation des systemes Groupe Moto-Propulseur Introduction", Oil & Gas Science and Technology—Rev. IFP, Dec. 6, 2007 (Dec. 6, 2007), pp. 539-553, XP055681293, DOI: 10.2516/ogst: Retrieved from the Internet: URL:https://ogst.ifpenergiesnouvelles.fr/articles/ogst/pdf/2007/04/ogst06108.pdf [retrieved on Mar. 31, 2020] p. 547.

* cited by examiner

USING AN ARTIFICIAL NEURAL NETWORK FOR COMBUSTION PHASING CONTROL IN A SPARK IGNITED INTERNAL COMBUSTION ENGINE

FIELD

The present application generally relates to spark ignition (SI) engines and, more particularly, to techniques for using an artificial neural network (ANN) for combustion phasing control in an SI engine.

BACKGROUND

A spark ignition (SI) engine combusts a mixture of air and fuel (e.g., gasoline) within cylinders to drive pistons that generate drive torque at a crankshaft. The air is drawn into the engine through an induction system and provided to the various cylinders via intake valves that are actuated by lobes of an intake camshaft. The air/fuel mixture is compressed by the pistons within the cylinders and the compressed air/fuel mixture is ignited by a spark provided by respective spark plugs. Exhaust gas resulting from combustion is expelled from the cylinders via respective exhaust valves that are actuated by lobes of an exhaust camshaft. The spark timing with respect to the respective piston strokes affects the quality of combustion. It is therefore important to accurately determine and control the spark timing because poor combustion quality due to inaccurate spark timing could result in decreased fuel economy and/or engine knock.

Conventional combustion phasing control techniques for SI engines use an empirical approach where multiple calibration tables and surfaces are utilized to determine the desired spark timing. This requires a substantial calibration effort and increased processor throughput. Further, for SI engines having a variable valve control (VVC) system, these empirical calibrations incur an accuracy penalty at off-nominal camshaft positions, due to superposition methodology. Accordingly, while such SI combustion phasing control systems do work for their intended purpose, there remains a need for improvement in the relevant art.

SUMMARY

According to one example aspect of the invention, a calibration system for a spark ignition (SI) engine of a vehicle is presented. In one exemplary implementation, the calibration system comprises dynamometer sensors configured to measure dynamometer data for the engine and a computing system configured to: receive the dynamometer data for the SI engine, artificially weight the engine dynamometer data in high engine load regions to obtain weighted engine dynamometer data, generate training data for an artificial neural network (ANN) using the weighted engine dynamometer data, train a plurality of ANNs using the generated training data, filter the plurality of trained ANNs based on their maximum error to obtain a filtered set of trained ANNs, perform a statistical analysis on each of the filtered set of trained ANNs including determining a set of statistical metrics for each of the filtered set of trained ANNs, select one of the filtered set of trained ANNs having a best combination of error at high engine loads and the set of statistical error metrics, and generate an ANN calibration using the selected one of the filtered set of trained ANNs.

In some implementations, the computer system is further configured to output the generated ANN calibration to a controller of the SI engine. In some implementations, receipt of the generated ANN calibration causes the controller to store the generated ANN calibration and use the generated ANN calibration for combustion phasing control to at least one of decrease engine knock and increase fuel economy. In some implementations, the use of the generated ANN calibration involves the controller: receiving, from camshaft position sensors, measured positions of intake and exhaust camshafts of the SI engine, receiving, from an air charge sensor, a measured air charge provided to each cylinder of the SI engine, receiving, from an engine speed sensor, a measured engine speed indicative of a rotational speed of a crankshaft of the SI engine, using the generated ANN calibration, determining at least one of a desired base spark timing and a desired maximum brake torque (MBT) spark timing based on the measured intake and exhaust camshaft positions, the measured air charge, and the measured engine speed, and controlling a spark system of the SI engine based on at least one of the desired base and MBT spark timings. In some implementations, the controller does not generate and output empirically calibrated surfaces for determining the base or MBT spark timings.

In some implementations, generating the training data for includes using the weighted engine dynamometer data and a mathematical method, wherein the generated training data includes more data points than the weighted engine dynamometer data. In some implementations, the set of statistical error metrics comprises at least one of a sum of squares due to error (SSE) and a root-mean-square error (RMSE). In some implementations, each of the plurality of trained ANNs defines two hidden layers, twelve neurons per hidden layer, a Bayesian regularization backpropagation training function, and a hyperbolic tangent sigmoid transfer function.

According to another example aspect of the invention, a calibration method for an SI engine of a vehicle is presented. In one exemplary implementation, the method comprises: receiving, by a calibration system, dynamometer data for the engine, artificially weighting, by the calibration system, the engine dynamometer data in high engine load regions to obtain weighted engine dynamometer data, generating, by the calibration system, training data for an ANN using the weighted engine dynamometer data, training, by the calibration system, a plurality of ANNs using the generated training data, filtering, by the calibration system, the plurality of trained ANNs based on their maximum error to obtain a filtered set of trained ANNs, performing, by the calibration system, a statistical analysis on each of the filtered set of trained ANNs including determining a set of statistical metrics for each of the filtered set of trained ANNs, selecting, by the calibration system, one of the filtered set of trained ANNs having a best combination of error at high engine loads and the set of statistical error metrics, and generating, by the calibration system, an ANN calibration using the selected one of the filtered set of trained ANNs.

In some implementations, the method further comprises outputting, by the calibration system and to a controller of the SI engine, the generated ANN calibration. In some implementations, receipt of the generated ANN calibration causes the controller to store the generated ANN calibration and use the generated ANN calibration for combustion phasing control to at least one of decrease engine knock and increase fuel economy. In some implementations, the use of the generated ANN calibration involves the controller: receiving, from camshaft position sensors, measured positions of intake and exhaust camshafts of the SI engine, receiving, from an air charge sensor, a measured air charge provided to each cylinder of the SI engine, receiving, from an engine speed sensor, a measured engine speed indicative of a rotational speed of a crankshaft of the SI engine, using the generated ANN calibration, determining at least one of a desired base spark timing and a desired MBT spark timing based on the measured intake and exhaust camshaft positions, the measured air charge, and the measured engine speed, and controlling a spark system of the SI engine based on at least one of the desired base and MBT spark timings. In some implementations, the controller does not generate and output empirically calibrated surfaces for determining the base or MBT spark timings.

In some implementations, generating the training data for includes using the weighted engine dynamometer data and a mathematical method, wherein the generated training data includes more data points than the weighted engine dynamometer data. In some implementations, the set of statistical error metrics comprises at least one of SSE and RMSE. In some implementations, each of the plurality of trained ANNs defines two hidden layers, twelve neurons per hidden layer, a Bayesian regularization backpropagation training function, and a hyperbolic tangent sigmoid transfer function.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As previously discussed, there remains a need for accurate combustion phasing control in spark ignition (SI) engines that do not require substantial empirically calibrated surfaces. Such empirical based techniques are also inaccurate at certain operating conditions, such as off-nominal camshaft positions when valve lift and/or valve timing is adjusted by a variable valve control (VVC) system. Accordingly, SI engine combustion phasing control techniques are presented that use a trained feed-forward artificial neural network (ANN) to model both base and maximum brake torque (MBT) spark timing based on only four inputs: intake and exhaust camshaft positions, an air charge being provided to each cylinder of the SI engine, and engine speed. The ANN is also trained using dynamometer data for the SI engine that is artificially weighted for high load regions where accuracy of spark timing is critical.

Figure 1:
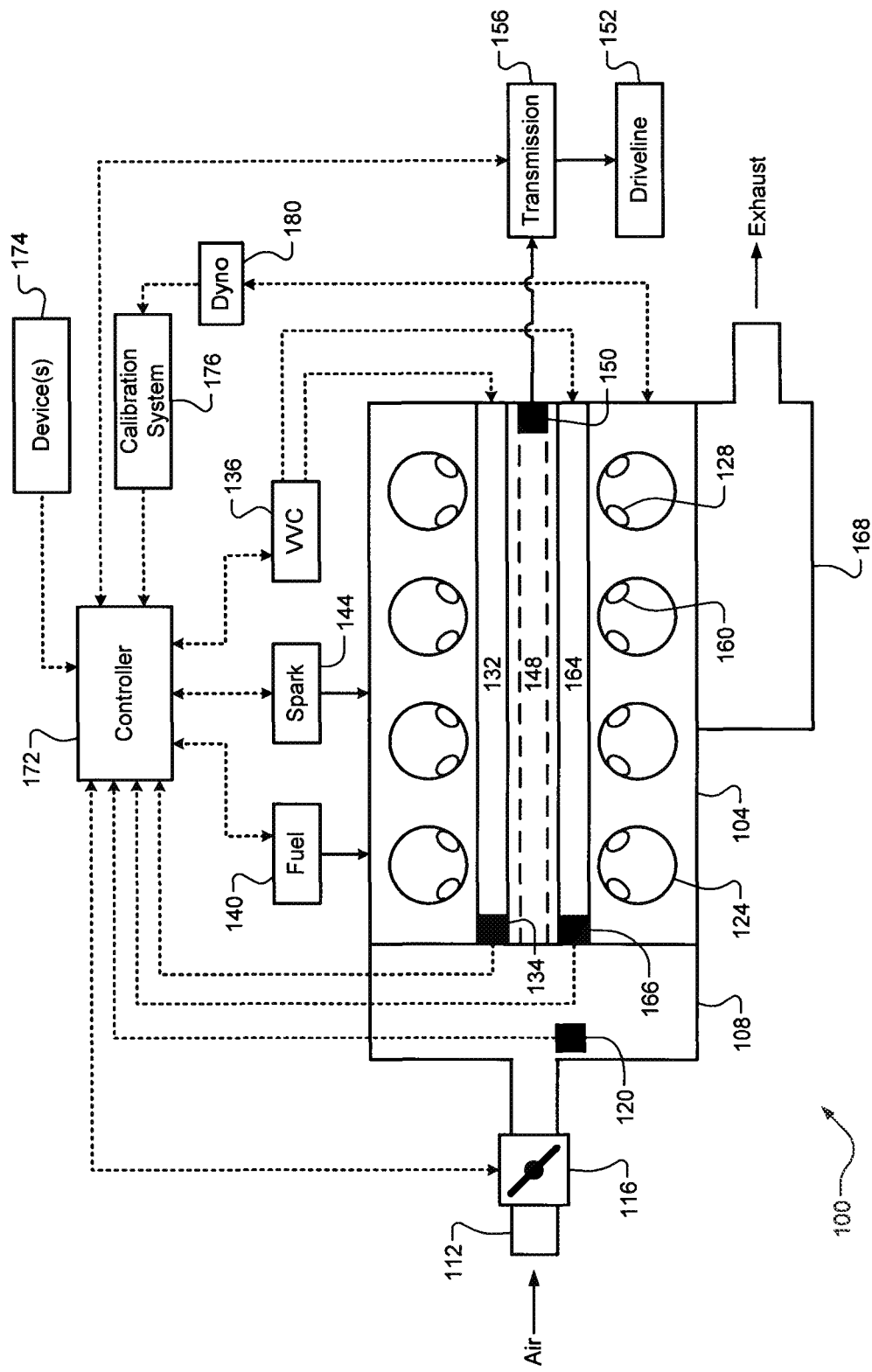
FIG. 1 is a diagram of an example spark ignition (SI) engine according to the principles of the present disclosure.

Referring now to FIG. 1, a diagram of an example vehicle 100 comprising an SI engine 104 (hereinafter, "engine 104"). The engine 104 draws air into an intake manifold 108 through an induction system 112 that is regulated by a throttle valve 116. A mass air flow (MAF) and/or manifold absolute pressure (MAP) sensor 120 (also referred to as "air charge sensor 120") measures air flow/pressure indicative of an air charge being provided to each of a plurality of cylinders 124 of the engine 104. While eight cylinders are shown, it will be appreciated that the engine 104 could include any suitable number of cylinders. Intake valves 128 regulate the flow into the respective cylinders 124. The intake valves 128 are actuated by lobes of an intake camshaft 132, which is also connected to a VVC system 136 that is configured to adjust the actuation of the intake valves 128 by the intake camshaft 132 to adjust intake valve lift and/or timing. Camshaft position sensor 134 measures a position of the intake camshaft 132. The air charge for each cylinder is combined with fuel (e.g., gasoline) from a fuel system 140 (via direct or port fuel injection) and the air/fuel mixture is compressed by respective pistons (not shown) within the cylinders 124. The compressed air/fuel mixture is then ignited by spark provided by a spark system 144 (e.g., one or more spark plugs for each respective cylinder 124).

The combustion of the compressed air/fuel mixture drives the pistons, which in turn rotatably turn a crankshaft 148 thereby generating drive torque. Engine speed sensor 150 measures a rotational speed of the crankshaft 148. The drive torque at the crankshaft 148 is then transferred to a driveline 152 of the vehicle 100 via a transmission 156. Exhaust gas resulting from combustion is expelled from the cylinders 124 via respective exhaust valves 160 that regulate the flow out of the respective cylinders 124. The exhaust valves 160 are actuated by lobes of an exhaust camshaft 164, which is also connected to the VVC system 136. Similar to the intake valves/camshaft, the VVC system 136 is configured to adjust exhaust valve lift and/or timing. Camshaft position sensor 166 measures a position of the exhaust camshaft 164. The exhaust gas expelled from the cylinders 124 is then treated by an exhaust system 168 to eliminate or mitigate emissions before being released into the atmosphere. Non-limiting example components of the exhaust system 168 include an exhaust manifold and a three-way catalytic converter.

A controller 172 controls operation of the engine 104. The controller 172 is configured to receive input from one or more input devices 174 as well as the various sensors 120, 134, 150, and 166. One non-limiting example of the one or more input devices 174 is an accelerator pedal. For example, a driver of the vehicle 100 could provide input via the accelerator pedal, which is indicative of a torque request. The controller 172 then controls the engine 104 (e.g., airflow, fuel, and spark) to achieve the torque request. A remote calibration system 176 that is not part of the vehicle 100 comprises a computer system that interacts with a dynamometer 180 (e.g., dynamometer sensors), which could be part of or separate from the calibration system 176, to obtain dynamometer data for the engine 104, which is utilized to generate an ANN calibration that is provided as input to the controller 172 and then utilized for combustion phasing control. The term "obtain" as used herein refers to all of the generated ANN calibration being transmitted to the controller 172 for storage in its memory and subsequent retrieval for usage.

ANN Design

The ANN is designed such that it is capable of accurately controlling spark in an SI engine. This design process involves the selection of various parameters, such as, but not limited to, input/output type and quantity, number of hidden layers, number of neurons per layer, and training/transfer functions. In one exemplary implementation, the optimal ANN design is four inputs (air charge, engine speed, and intake/exhaust camshaft positions), two outputs (base and MBT spark timing), two hidden layers, twelve neurons per layer, a Bayesian regularization backpropagation training function (also known as "trainbr"), and a hyperbolic tangent sigmoid transfer function (also known as "tansig"). It will be appreciated, however, that this is merely one exemplary ANN design and that these parameters could vary depending on the specific vehicle/engine application. For example only, another suitable training function, such as a Levenberg-Marquardt backpropagation training function (also known as "trainlm"), and/or another suitable transfer function, such as rectified linear units (also known as "ReLu"), could be utilized. Other suitable types and/or quantities of inputs and/or outputs could also be utilized.

ANN Training/Calibration

Figure 2:
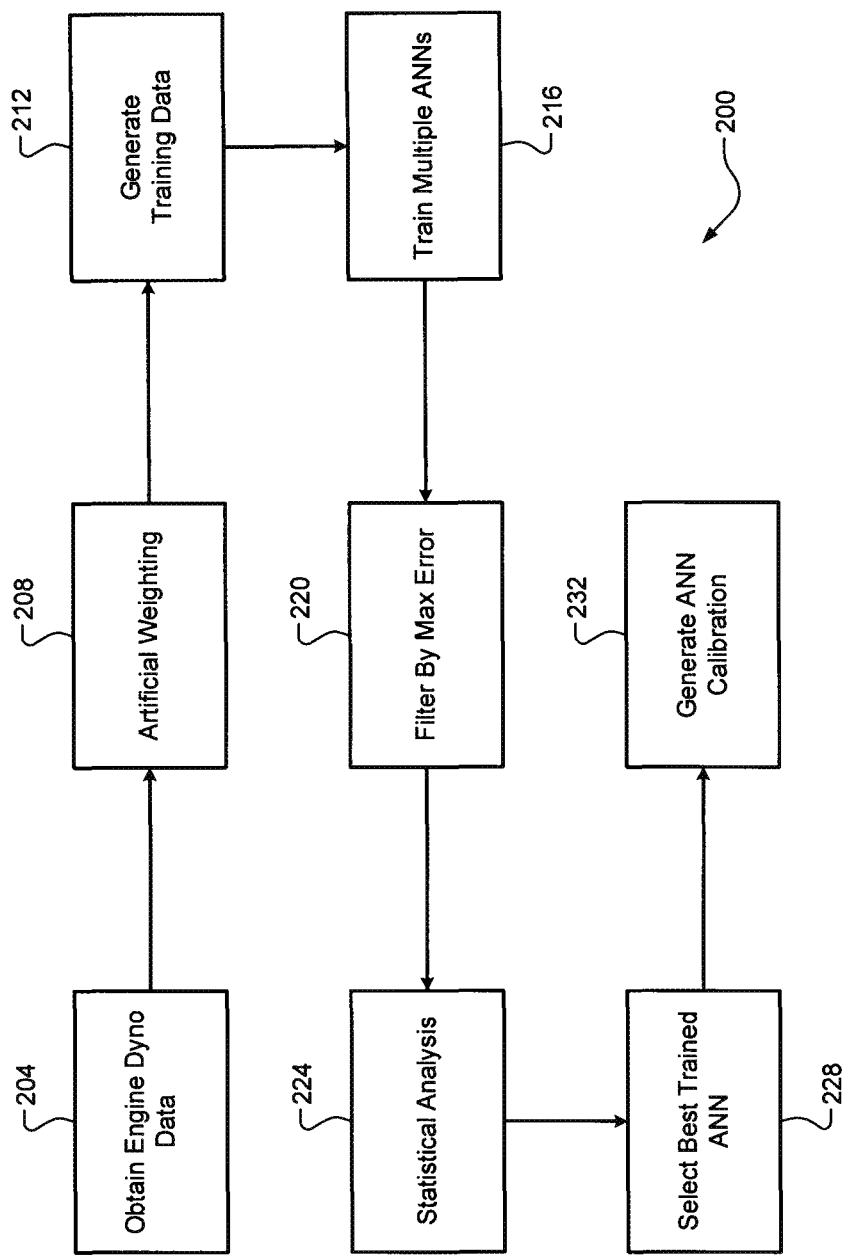
FIG. 2 is a functional block diagram of an example artificial neural network (ANN) training/calibration architecture according to the principles of the present disclosure.

Referring now to FIG. 2, a functional block diagram of an example ANN training architecture 200 is illustrated. At 204, engine dynamometer ("dyno") data is gathered and is then artificially weighted at 208. This artificial weighting involves artificially weighting the dyno data at higher engine loads because accurate spark control is critical at these operating ranges. For example, an over advanced spark at very high engine loads could cause engine damage at certain conditions. At 212, training data is generated using the weighted engine dyno data. For example, a large quantity of training data (e.g., 10,000 to 40,000 data points) could be generated from the smaller quantity of engine dyno data (e.g., 1000 to 2000 data points) using any suitable mathematical method. For example only, this could include running simulations using the existing dyno data to generate additional training data. This is performed because ANN training requires a large number of training samples to reduce the risk of overfitting. In addition, a large quantity of training data ensures that each ANN sees every possible engine operating condition in the training phase so that they do not extrapolate into unknown regions in real-world applications. At 216, the ANN is trained multiple times to obtain a plurality of trained ANNs.

At 220, maximum error filtering of the trained ANNs is performed to obtain a desired number of trained ANNs. For example only, the desired number of trained ANNs could be five. This maximum error filtering involves discarding any trained ANNs having a maximum error (e.g., either base or MBT spark timing) greater than an error threshold. At 224, a statistical analysis of the remaining trained ANNs is performed. The set of statistical error metrics include, for example only, a sum of squares due to error (SSE), a root-mean-square error (RMSE), and an error distribution (e.g., across a full range of engine loads). At 228, the best performing trained ANN (based on the set of statistical error metrics) is then selected based on the statistical error metric(s). For example only, this could be the trained ANN that has the best combined performance (SSE and RMSE) in addition to lower error at high engine loads. At 232, the selected trained ANN is utilized to generate an ANN calibration for use by the controller 172 of the engine 104. This could include, for example, loading the ANN calibration into a memory of the controller 172 for subsequent spark control.

Calibrated ANN Implementation

Figure 3:
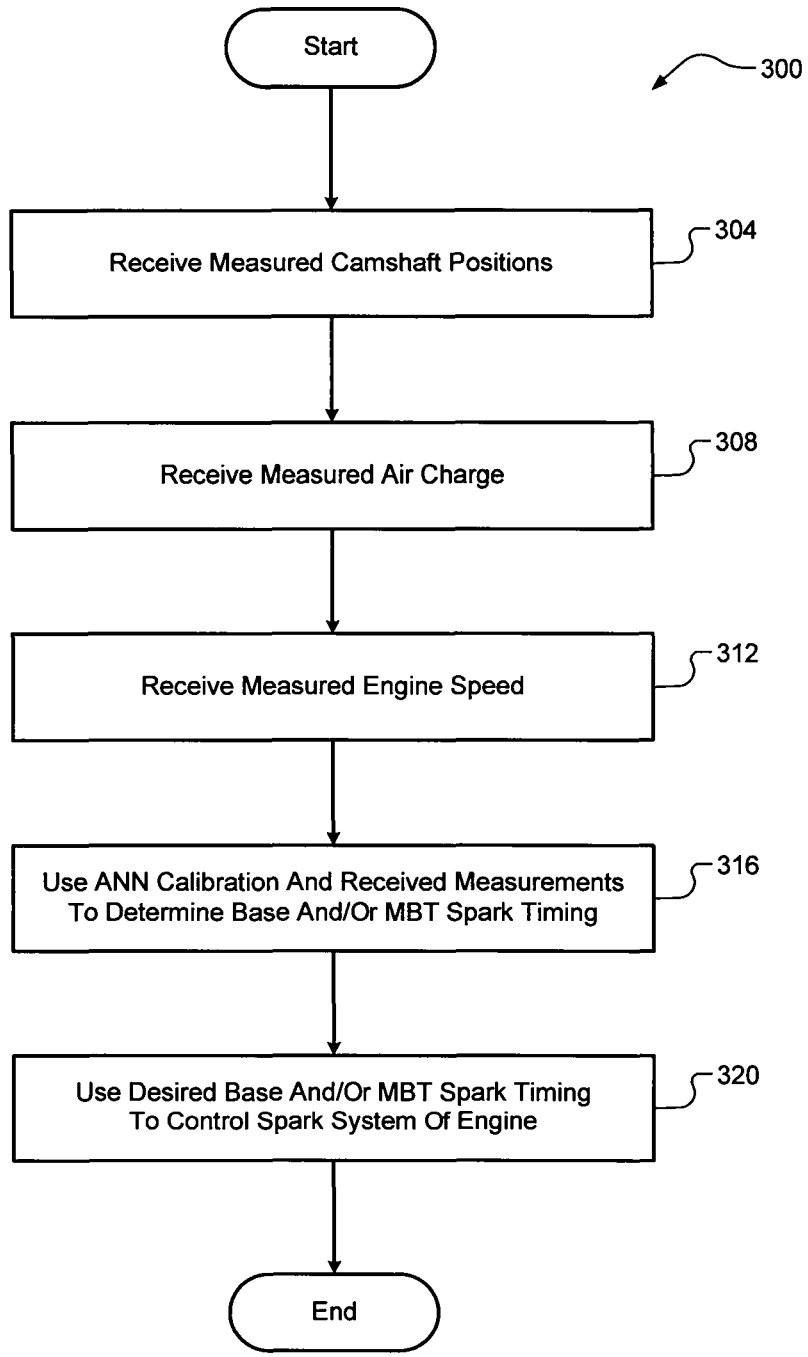
FIG. 3 is a flow diagram of an example combustion phasing control method for an SI engine according to the principles of the present disclosure.

Referring now to FIG. 3, a flow diagram of an example combustion phasing control method 300 for an SI engine (e.g., engine 104) is illustrated. This method 300 is implemented by the controller 172 of the engine 104 after the generation of the ANN calibration at 232 in FIG. 2. At 304, the controller 172 receives the measured camshaft positions from camshaft position sensors 134, 166. At 308, the controller 172 receives the measured air charge based on measurements from air flow/pressure sensor 120. At 312, the controller 172 receives a measured engine speed from engine speed sensor 150. At 316, the controller 172 uses the measured parameters as inputs to the calibrated ANN to determine base and MBT spark timing. At 320, the controller 172 then controls combustion (e.g., timing of spark provided by spark system 144) using at least one of the base and MBT spark timings. The method 300 then ends or returns to 304.

It will be appreciated that the term "controller" as used herein refers to any suitable cont of device(s) that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture. It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A calibration system for a spark ignition (SI) engine of a vehicle, the calibration system comprising:
   dynamometer sensors configured to measure dynamometer data for the SI engine; and
   a computing system configured to:
      receive the dynamometer data for the SI engine,
      artificially weight the dynamometer data in high engine load regions to obtain weighted engine dynamometer data,
      generate training data for an artificial neural network (ANN) using the weighted engine dynamometer data,
      train a plurality of ANNs using the generated training data,
      filter the plurality of trained ANNs based on their maximum error to obtain a filtered set of trained ANNs,
      perform a statistical analysis on each of the filtered set of trained ANNs including determining a set of statistical metrics for each of the filtered set of trained ANNs,
      select one of the filtered set of trained ANNs having a best combination of error at high engine loads and the set of statistical metrics, and
      generate an ANN calibration using the selected one of the filtered set of trained ANNs.

2. The calibration system of claim 1, wherein the computing system is further configured to output the generated ANN calibration to a controller of the SI engine.

3. The calibration system of claim 2, wherein receipt of the generated ANN calibration causes the controller to store the generated ANN calibration and use the generated ANN calibration for combustion phasing control to at least one of decrease engine knock and increase fuel economy.

4. The calibration system of claim 3, wherein the use of the generated ANN calibration involves the controller:
receiving, from camshaft position sensors, measured positions of intake and exhaust camshafts of the SI engine;
receiving, from an air charge sensor, a measured air charge provided to each cylinder of the SI engine;
receiving, from an engine speed sensor, a measured engine speed indicative of a rotational speed of a crankshaft of the SI engine;
using the generated ANN calibration, determining at least one of a desired base spark timing and a desired maximum brake torque (MBT) spark timing based on the measured intake and exhaust camshaft positions, the measured air charge, and the measured engine speed; and
controlling a spark system of the SI engine based on at least one of the desired base and MBT spark timings.

5. The calibration system of claim 4, wherein the controller does not generate and output empirically calibrated surfaces for determining the base or MBT spark timings.

6. The calibration system of claim 1, wherein generating the training data includes using the weighted engine dynamometer data and a mathematical method, wherein the generated training data includes more data points than the weighted engine dynamometer data.

7. The calibration system of claim 1, wherein the set of statistical metrics comprises at least one of a sum of squares due to error (SSE) and a root-mean-square error (RMSE).

8. The calibration system of claim 1, wherein each of the plurality of trained ANNs defines two hidden layers, twelve neurons per hidden layer, a Bayesian regularization backpropagation training function, and a hyperbolic tangent sigmoid transfer function.

9. A calibration method for a spark ignition (SI) engine of a vehicle, the method comprising:
receiving, by a calibration system, dynamometer data for the SI engine;
artificially weighting by the calibration system, the dynamometer data in high engine load regions to obtain weighted engine dynamometer data;
generating, by the calibration system, training data for an artificial neural network (ANN) using the weighted engine dynamometer data;
training, by the calibration system, a plurality of ANNs using the generated training data;
filtering, by the calibration system, the plurality of trained ANNs based on their maximum error to obtain a filtered set of trained ANNs;
performing, by the calibration system, a statistical analysis on each of the filtered set of trained ANNs including determining a set of statistical metrics for each of the filtered set of trained ANNs;
selecting, by the calibration system, one of the filtered set of trained ANNs having a best combination of error at high engine loads and the set of statistical metrics; and
generating, by the calibration system, an ANN calibration using the selected one of the filtered set of trained ANNs.

10. The calibration method of claim 9, further comprising outputting, by the calibration system and to a controller of the SI engine, the generated ANN calibration.

11. The calibration method of claim 10, wherein receipt of the generated ANN calibration causes the controller to store the generated ANN calibration and use the generated ANN calibration for combustion phasing control to at least one of decrease engine knock and increase fuel economy.

12. The calibration method of claim 11, wherein the use of the generated ANN calibration involves the controller:
receiving, from camshaft position sensors, measured positions of intake and exhaust camshafts of the SI engine;
receiving, from an air charge sensor, a measured air charge provided to each cylinder of the SI engine;
receiving, from an engine speed sensor, a measured engine speed indicative of a rotational speed of a crankshaft of the SI engine;
using the generated ANN calibration, determining at least one of a desired base spark timing and a desired maximum brake torque (MBT) spark timing based on the measured intake and exhaust camshaft positions, the measured air charge, and the measured engine speed; and
controlling a spark system of the SI engine based on at least one of the desired base and MBT spark timings.

13. The calibration method of claim 12, wherein the controller does not generate and output empirically calibrated surfaces for determining the base or MBT spark timings.

14. The calibration method of claim 9, wherein generating the training data includes using the weighted engine dynamometer data and a mathematical method, wherein the generated training data includes more data points than the weighted engine dynamometer data.

15. The calibration method of claim 9, wherein the set of statistical metrics comprises at least one of a sum of squares due to error (SSE) and a root-mean-square error (RMSE).

16. The calibration method of claim 9, wherein each of the plurality of trained ANNs defines two hidden layers, twelve neurons per hidden layer, a Bayesian regularization backpropagation training function, and a hyperbolic tangent sigmoid transfer function.

* * * * *